United States Patent
Storm et al.

(10) Patent No.: US 11,216,680 B2
(45) Date of Patent: Jan. 4, 2022

(54) SPOOF DETECTION VIA 3D RECONSTRUCTION

(71) Applicant: Advanced New Technologies Co., Ltd., Grand Cayman (KY)

(72) Inventors: Gregory Lee Storm, Parkville, MO (US); Reza R. Derakhshani, Shawnee, KS (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/208,842

(22) Filed: Mar. 22, 2021

(65) Prior Publication Data
US 2021/0232838 A1     Jul. 29, 2021

Related U.S. Application Data

(63) Continuation of application No. 16/370,691, filed on Mar. 29, 2019, now Pat. No. 10,953,762.

(51) Int. Cl.
    *G06K 9/00*      (2006.01)
    *G06T 7/55*      (2017.01)
    *G06F 21/32*      (2013.01)
    *G06T 17/00*      (2006.01)

(52) U.S. Cl.
CPC ......... *G06K 9/00899* (2013.01); *G06F 21/32* (2013.01); *G06K 9/00288* (2013.01); *G06T 7/55* (2017.01); *G06T 17/00* (2013.01); *G06T 2207/30201* (2013.01)

(58) Field of Classification Search
CPC ........... G06K 9/00899; G06K 9/00288; G06K 9/00617; G06K 9/00208; G06T 7/55; G06T 17/00; G06T 2207/30201; G06F 21/32
See application file for complete search history.

(56) References Cited

U.S. PATENT DOCUMENTS

| | | | |
|---|---|---|---|
| 8,457,367 B1 | 6/2013 | Sipe et al. | |
| 9,058,519 B2 | 6/2015 | Law et al. | |
| 9,117,109 B2 | 8/2015 | Nechyba et al. | |

(Continued)

OTHER PUBLICATIONS

Wikipedia [online], "Fundamental matrix (computer vision)," Jul. 2019, retrieved on Dec. 19, 2019, retrieved from URL<https://en.wikipedia.org/wiki/Fundamental_matrix_(computer_vision)>, 5 pages.

(Continued)

*Primary Examiner* — Diane D Mizrahi
(74) *Attorney, Agent, or Firm* — Fish & Richardson P.C.

(57) ABSTRACT

In one aspect, a method includes receiving a sequence of images of a subject, the sequence captured by an image acquisition device over a time period in which relative locations of the image acquisition device varies with respect to the subject. A first image and a second image are selected from the first sequence of images. The first and second images represent a first relative location and a second relative location, respectively, of the image acquisition device with respect to the subject. A three-dimensional representation of the first subject is generated using the first image and the second image as a stereo pair. It is determined, based on the first three dimensional representation, that the first subject is an alternative representation of a live person, and in response, access to a secure system is prevented.

20 Claims, 5 Drawing Sheets

(56) References Cited

U.S. PATENT DOCUMENTS

| | | | |
|---|---|---|---|
| 9,928,603 | B2 | 3/2018 | Martin |
| 10,346,990 | B2 | 7/2019 | Martin |
| 10,515,199 | B2 | 12/2019 | Samadani et al. |
| 10,659,405 | B1 | 5/2020 | Chang et al. |
| 10,698,995 | B2 | 6/2020 | Tussy |
| 2011/0050853 | A1 | 3/2011 | Zhang et al. |
| 2013/0212655 | A1 | 8/2013 | Hoyos et al. |
| 2014/0016837 | A1 | 1/2014 | Nechyba et al. |
| 2014/0307929 | A1 | 10/2014 | Nechyba et al. |
| 2016/0188958 | A1 | 6/2016 | Martin |
| 2017/0042439 | A1 | 2/2017 | Yeow et al. |
| 2018/0063484 | A1* | 3/2018 | Smits ................ G02B 27/0101 |

OTHER PUBLICATIONS

U.S. Appl. No. 16/370,691, filed Mar. 29, 2019, Gregory Lee Storm.
U.S. Appl. No. 16/448,995, filed Jun. 21, 2019, Gregory Lee Storm.
U.S. Appl. No. 16/520,839, filed Jul. 24, 2019, Gregory Lee Storm.

* cited by examiner

SPOOF DETECTION VIA 3D RECONSTRUCTION

CROSS-REFERENCE TO RELATED APPLICATIONS

This application is a continuation of U.S. patent application Ser. No. 16/370,691, filed Mar. 29, 2019, which is hereby incorporated by reference in its entirety.

TECHNICAL FIELD

This disclosure relates to image capture devices used in biometric authentication.

BACKGROUND

Systems incorporating a biometric identification technology such as face recognition or iris recognition often include a camera that captures an image of a user. The captured image is then processed to authenticate the user using the biometric identification technology.

SUMMARY

In one aspect, this document describes a method that includes receiving, at one or more processing devices, a first sequence of images of a first subject. The first sequence of images is captured by an image acquisition device over a time period in which relative locations of the image acquisition device with respect to the first subject varies. The method also includes selecting, by the one or more processing devices, a first image and a second image from the first sequence of images. The first image represents a first relative location of the image acquisition device with respect to the first subject, and the second image represents a second relative location, different from the first relative location, of the image acquisition device with respect to the first subject. The method also includes generating, by the one or more processing devices and using the first image and the second image as a stereo pair, a first three-dimensional representation of the first subject. The method further includes determining, based on the first three dimensional representation, that the first subject is an alternative representation of a live person, and in response, preventing access to a secure system.

In another aspect, this document describes a system that includes an image acquisition device that captures a first sequence of images of a first subject. The first sequence of images is captured over a time period in which relative locations of the image acquisition device with respect to the first subject varies. The system also includes an image analysis engine that includes one or more processing devices. The image analysis engine receives the first sequence of images, and selects a first image and a second image from the first sequence of images. The first image represents a first relative location of the image acquisition device with respect to the first subject, and the second image represents a second relative location of the image acquisition device with respect to the first subject. The second relative location is different from the first relative location. The image analysis engine generates, using the first image and the second image as a stereo pair, a first three-dimensional representation of the first subject, determines, based on the first three dimensional representation, that the first subject is an alternative representation of a live person, and in response prevents access to a secure system.

In another aspect, this document describes one or more non-transitory machine-readable storage devices having encoded thereon computer readable instructions for causing one or more processing devices to perform various operations. The operations include receiving a first sequence of images of a first subject. The first sequence of images is captured by an image acquisition device over a time period in which relative locations of the image acquisition device with respect to the first subject varies. The operations also include selecting a first image and a second image from the first sequence of images. The first image represents a first relative location of the image acquisition device with respect to the first subject, and the second image represents a second relative location, different from the first relative location, of the image acquisition device with respect to the first subject. The operations include generating, by the one or more processing devices and using the first image and the second image as a stereo pair, a first three-dimensional representation of the first subject. The operations further include determining, based on the first three dimensional representation, that the first subject is an alternative representation of a live person, and in response, preventing access to a secure system.

In some implementations, the above aspects of the technology can include one or more of the following features.

The image acquisition device can be a camera disposed on a mobile device, and the sequence of images can be captured as the mobile device is moved towards the first subject. The image acquisition device can be a camera disposed on a kiosk device, and the sequence of images can be captured as the first subject moves towards the kiosk device. The alternative representation of the live person can include a photograph of the live person printed on paper, or presented on a display device. The first three dimensional representation can be generated using a photometric stereo process for estimating a three dimensional shape from two dimensional images. The photometric stereo process can include a structure-from-motion process. The photometric stereo process can include a shape-from-shading process.

In some implementations, a second sequence of images of a second subject can be captured by the image acquisition device over a time period in which relative locations of the image acquisition device with respect to the second subject varies. A third image and a fourth image can be selected from the second sequence of images, wherein the third image represents a first relative location of the image acquisition device with respect to the second subject, and the fourth image represents a second relative location, different from the first relative location, of the image acquisition device with respect to the second subject. A second three-dimensional representation of the second subject can be generated using the third image and the fourth image as a stereo pair. A determination may be made, based on the second three dimensional representation, that the second subject is a live person, and in response, an authentication process can be initiated to determine if the live person is authorized to access the secure system.

Various implementations described herein may provide one or more of the following advantages. By capturing a sequence of images during periods of relative movements between a subject and an image capture device, images from multiple viewpoints can be captured using a single camera. Two or more images (e.g., a stereo pair) from the sequence can therefore be used in generating a three dimensional (3D) representation of a subject using, for example, photometric stereo processes. Such 3D representations can then be used in detecting whether the subject in the image is a live human, or a spoof alternative representation (e.g., a photograph of a human printed on paper, or presented on a high-resolution display device). The technology described herein can therefore facilitate implementation of spoof detection based on 3D techniques, but without using more than one camera as is otherwise needed in capturing stereo pairs of images. This in turn can allow for a spoof detection system to be implemented on resource-constrained environments such as mobile devices, and/or reduce hardware complexities associated with other devices using image-based biometric authentication. By allowing for a quick discrimination between an image of a live person and an image of a spoof alternative representation, additional processing can be pre-emptively terminated, thereby creating an additional layer of security.

Figure 1C:
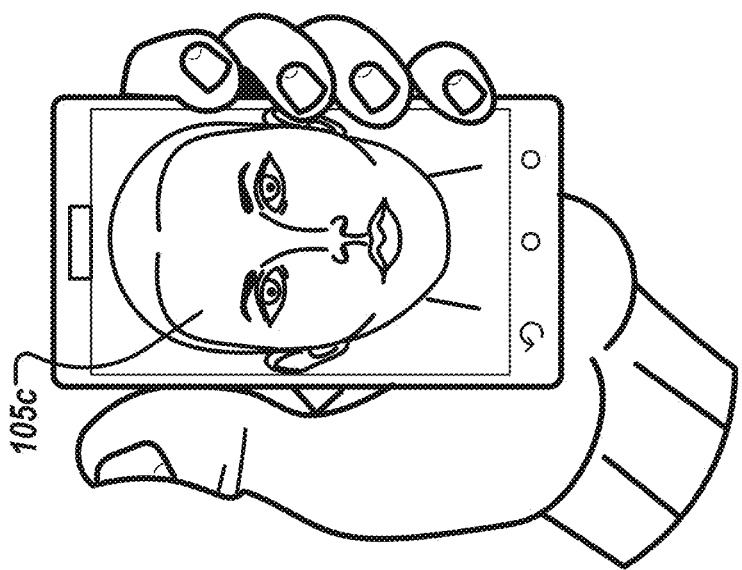
FIGS. 1A-1C show a mobile device capturing images of a subject from different relative locations of the subject and the mobile device, as an example environment in which the technology described herein may be used.

Repeat use of reference characters in the present specification and drawings is intended to represent same or analogous features or elements.

DETAILED DESCRIPTION

This document presents an image analysis method in which multiple images captured using an image acquisition device is analyzed to determine if the subject in the images is an actual live person, or an alternative representation (e.g., a photograph or another image of the live person printed on paper, or displayed on a high definition display device) of the live person. Specifically, the technology described herein includes capturing multiple images of a subject using a single image acquisition device (e.g., a camera of a mobile device) from various relative positions of the image acquisition device and the subject, and then generating a 3D representation of the subject by using at least two of the multiple images as a stereo pair. In one example implementation, when a mobile device is used to capture a facial image (e.g., for a face/iris/eyeprint image based biometric authentication process), the mobile device is gradually brought in alignment with the subject. The camera of the mobile device can be triggered to capture a sequence of additional images (e.g., as a series of video frames) over the time period in which the camera is brought in alignment with the subject to capture a final image. The additional images in such a sequence are likely to include at least two images in which the face is captured from two different locations. A 3D representation of the subject's face can then be generated from such an image pair using a photometric stereo process, and the 3D representation can be used in determining whether the subject is a live person, or a spoof alternative representation of the live person. For example, if the subject is a photograph or another image of the live person printed on paper, or displayed on a high definition display device, any 3D representation generated from images of such a subject would show that the face of the subject is in fact not three-dimensional. Accordingly, an inference can be made that the subject in the captured images is not a live person. As such, the technology described herein allows for liveness detection using an image capture device (e.g., a camera, and optionally a flash, of a mobile device) but without using additional secondary devices (e.g., an additional camera or special-purpose illuminators)

If the captured images are not determined to correspond to a live person, any further processing of the captured images by the biometric authentication system can be stopped, and any corresponding access attempt can be prevented immediately. Many biometric authentication systems involve authenticating a user to a secure system based on recognizing the user's face, eye-print, iris etc. Such biometric authentication systems involve capturing one or more images of a user, and executing corresponding recognition processes on the captured image. Malicious attempts to breach the security of such biometric authentication systems can include presenting an alternative representation of a live person to gain access to an account or other privileges associated with the identity of the corresponding live person. Such attacks are generally known as spoof attacks, and the reliability/security of a biometric authentication system can be determined by the ability of the system to differentiate between a live person and corresponding alternative representations (also referred to as spoofs). The technology described herein improves security/reliability of biometric authentication systems that rely on recognizing a user based on face recognition, eye-print recognition, iris recognition etc. Specifically, this document describes pre-processing steps that allow for determining whether the captured image corresponds to an actual live person or a spoof alternative representation such as a printed or displayed image/photograph of the live person.

3D reconstruction based techniques can be effective in determining whether a subject is a live person or a spoof alternative representation. However, it can be challenging to generate 3D representations in devices that do not have at least two spatially separated cameras. The technology described in this document allows for generation of 3D representations using at least two images that are captured using a single camera, but from two different relative locations of the subject and the image capture device. Based on detecting that the captured image is a spoof, any further processing of the image to allow access to a corresponding secure system can be prevented, thereby adding an added layer of security to the system. The technology can be used in mobile devices, as well as in larger devices (e.g., kiosk devices) where a subject (and not the device) moves to achieve alignment between the subject and a corresponding camera of the device. Examples of these environments are described next.

Figure 1B:
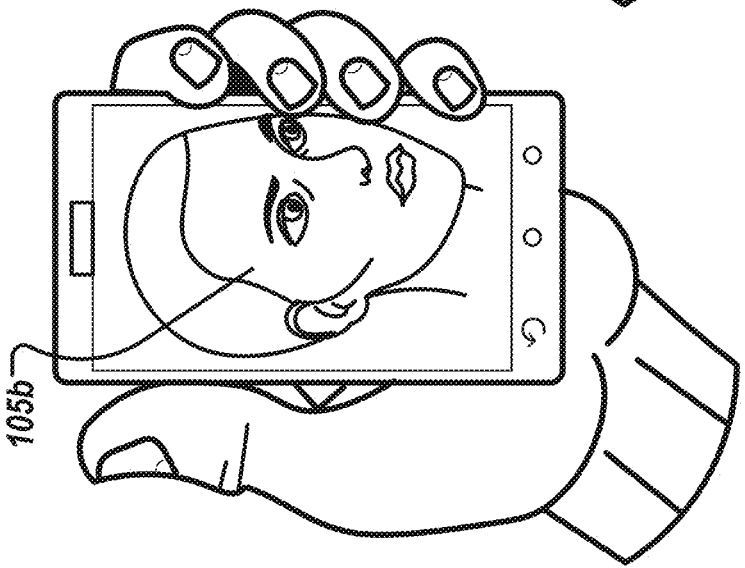
Figure 1A:
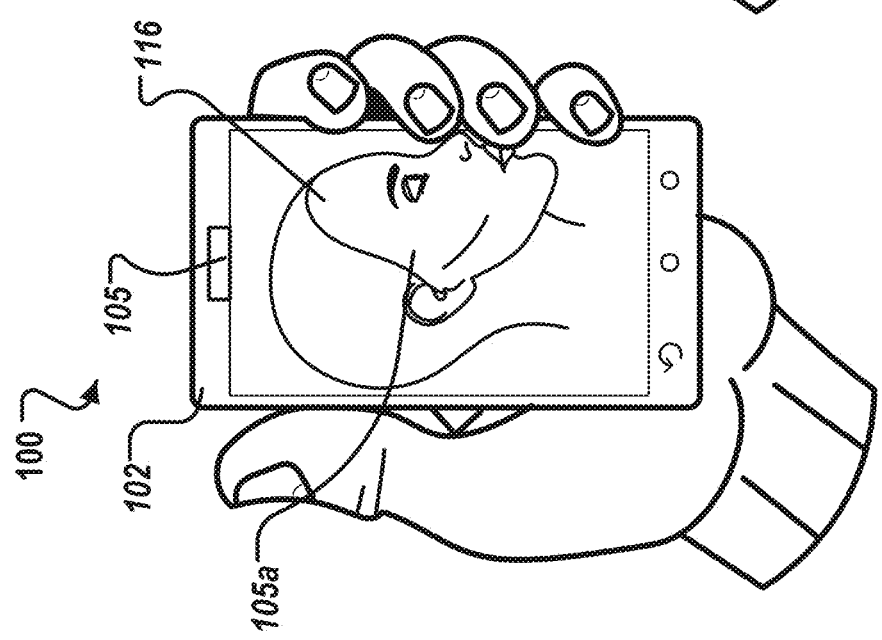

FIGS. 1A-1C show a mobile device 102 capturing images of a subject from different relative locations of the subject and the mobile device, as an example environment 100 in which the technology described herein may be used. For example, the mobile device 102 can be used to authenticate a user to one or more services (e.g., a payment processing service) made available to the user via an application executing on the mobile device. The application executing on the mobile device 102 can require the user to be authenticated via a biometric authentication process before allowing access to a secure system associated with the services. In some implementations, a face/iris/eyeprint based biometric authentication process may be used, which in turn may require capture of a facial image of the user.

In the example of FIGS. 1A-1C, the mobile device 102 is used to capture a facial image of a subject, using the camera 104 of the mobile device 102. In an example use-case scenario, the mobile device 102 is gradually lifted towards a face of the subject to capture a final image 105c (in FIG. 1C) that may be usable in a biometric authentication process. However, because the mobile device would likely be aligned to the face gradually over a short time period, a sequence of additional images 105a (FIG. 1A) and 105b (FIG. 1B) may be captured during that time period. Because the relative locations of the mobile device and the subject varies over that time period, the images 105a, 105b, and 105c (105, in general) represent images of the subject as captured from multiple locations of the mobile device 102 with respect to the subject. In some cases, at least two of the images in the sequence 105 can represent a stereo pair of images captured from, two locations separated by a known distance. Such a stereo pair of images can then be used in generating a 3D representation of the subject via a photometric stereo technique such as a structure-from-motion (SfM) process or a shape-from-shading (SfS) process. In some implementations, the mobile device 102 can include an illumination source 107 to illuminate the subject during the capture of the sequence of images. The resultant difference in shading in two or more images of the sequence can be used to discriminate between live persons and alternative representations of live persons. In some implementations, the difference in shading between two or more images can be leveraged to generate the 3D representation using a shape-from-shading process. The 3D representation can then be used to determine whether the subject is a live person, or a spoof alternative representation of a live person such as a photograph printed on paper or presented on a display device.

Therefore, the SfM or SfS techniques are used in liveness detection to discriminate between live and spoof alternative representations at least because the shapes generated from live versus spoof objects can be significantly different. For example, photograph of a person includes shading relative to the light at the time the photograph is captured. If additional light is supplied (i.e. using a flash) when capturing an image of such a photograph (i.e., a spoof representation), the inherent shades of the photograph do not disappear. In the case of a live person, however, the additional light supplied during the capture causes significant changes to the shading in resulting images. The difference in the corresponding 3D representations generated in the two above instances is significantly different as well. In some implementations, the difference in the corresponding 3D representations can be enhanced by illuminating the subjects with light that includes one or more particular wavelengths, and then filtering the captured images to isolate components of those particular one or more wavelengths. In effect, using the one or more particular wavelengths in this way substantially reduces any unwanted interactions between those wavelengths and other wavelength, which can potentially result in artifacts attributable to the additional light.

Figure 2:
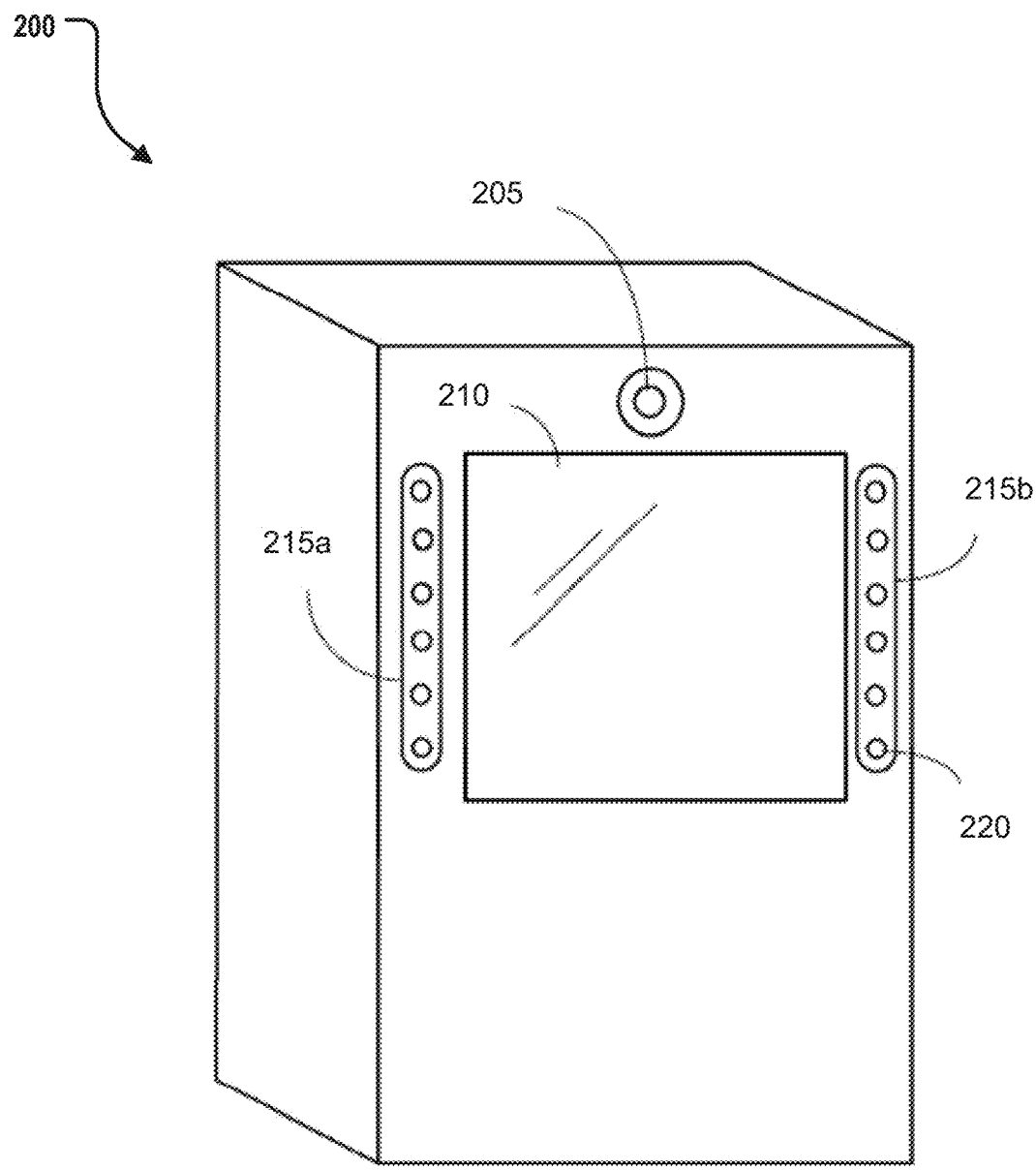
FIG. 2 shows a kiosk machine as another example environment in which the technology described herein may be used.

The technology described herein can also be used in devices that are relatively larger than mobile devices, and where the subject (and not the device) is moved to achieve alignment with a camera. FIG. 2 shows a kiosk machine 200 as an example of such an environment in which the technology described herein may be used. Such kiosk machines 200 may be used for various purposes that require identifying/verifying users via one or more biometric authentication processes. For example, the kiosk 200 can include an ATM that allows a user to withdraw money from a bank account. In another example, the kiosk 200 may be deployed at a restaurant or a fast-food outlet, and allow a user to order and pay for food. The kiosk 200 may also be deployed at an entry point (e.g., at the gate of an arena or stadium) to identify/verify entrants prior to entering the venue. In general, the kiosk 200 may be deployed at various types of locations to identify/verify users interactively, or even without any active participation of the user.

In some implementations, the kiosk 200 can include one or more components that support a biometric authentication system. For example, the kiosk 200 can include a camera 205 that captures images of users interacting with the kiosk 200. In some implementations, the kiosk 200 can include one or more illumination sources 215a and 215b (215, in general) that may be spatially separated from one another by a known distance. In some implementations, the illumination sources 215 may generate electromagnetic radiation at multiple wavelengths. For example, the illumination sources 215 can each include one or more light emitting diode (LED) elements 220 that may be controlled to generate electromagnetic radiation at different wavelength ranges. The camera 205 can be used, possibly in conjunction with the one or more illumination sources 215 to capture images of a subject. For example, if the illumination sources are activated at the time of capture of the sequence of images, the difference in shading in various images can be leveraged via a shape-from-shading (SfS) process to generate a 3D representation of the subject.

The captured images may be processed to identify/verify valid users, and/or permit or deny access to the services/products being offered through the kiosk. For example, the kiosk 200 may include a display device 210 (e.g., a capacitive touch screen) that allows a user to select and order food at a retail outlet. Once the user completes the selection via user-interfaces presented on the display device 210, the user may be asked to look towards the camera 205 for authentication. The images captured using the camera 205 may then be used to verify/identify a pre-stored profile for the user, and the payment for the food may then be automatically deducted from an account linked to the profile. In doing so, a subject may move relative to the kiosk machine 200 to be aligned with the camera 205. If a sequence of images are captured by the camera 205 during such relative motion between the subject and the kiosk 200, a 3D representation of the subject can be generated from one or more of the images in such as sequence, substantially similarly to the process described above with reference to FIGS. 1A-1C.

The distance between the capture locations of the two images in a stereo pair may be determined in various ways. In the example of the mobile device 102 (FIGS. 1A-1C), the relative separation of the locations corresponding to a pair of images (e.g., the image 105a and 105b) ca no [0000] n be determined based on sensor outputs from one or more sensors disposed in the mobile device. For example, the relative separation/orientation of capture-locations corresponding to two images can be determined based on an output of one or more of: an accelerometer, a gyroscope, a magnetometer, or another micro-electro-mechanical system (MEMS) sensor disposed in the mobile device 102. Optical sensors (e.g., one or more cameras and optical flow sensors), or other sensors that allow for measuring/characterizing movements of the mobile device 102 may also be used. For example, it may be possible to use a wireless module (e.g., a Bluetooth® module or a Wi-Fi module) of the mobile device 102 to detect how the movement of the mobile device in a corresponding wireless network affects (or perturbs) one or more network parameters. Such information may in turn be used to determine location of the mobile device in an environment, and hence used for the purposes described herein. For a relatively larger device such as the kiosk 200, distance between the capture locations of the two images in a stereo pair may be determined, for example, using one or more sensors associated with the kiosk 200. For example, a pressure sensing (e.g., piezoelectric) floor or mat can be disposed in front of the kiosk 200 for the purpose of determining a location of a subject at the time of capture of the corresponding images. Other sensors such as a proximity sensor, a time-of-flight (ToF) sensor, or other sensors capable of sensing variations in location as a subject aligns to the camera, can be used.

Figure 3:
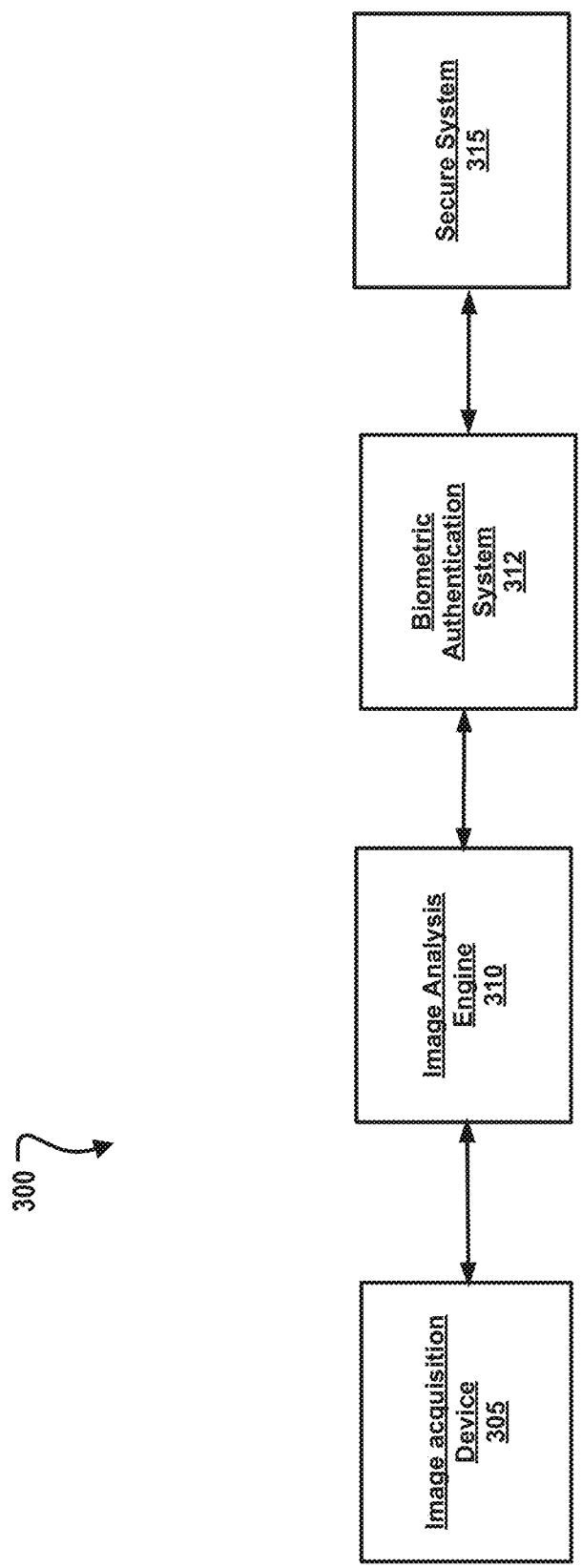
FIG. 3 is an example system that can be used for implementing technology described herein.

FIG. 3 is an example system that can be used for implementing technology described herein. The system 300 includes an image acquisition device 305, and image analysis engine 310, and a secure system 315 an access to which is controlled via a biometric authentication system. The image acquisition device 305 can be substantially similar to the camera 104 of the mobile device 102 (FIG. 1A), or the camera 205 of a relatively larger immobile device such as the kiosk 200 (FIG. 2). In some implementations, the image acquisition device can include a video camera that captures a sequence of images of a subject within a time period.

The system 300 also includes an image analysis engine 310 that can be configured to implement one or more processes in accordance with technology herein. For example, the image analysis engine 310 can select multiple images from a sequence of images captured by the image acquisition device 305, and generate the 3D representation using the selected images. In some implementations, the image analysis engine 310 can be located at a remote location with respect to the image acquisition device 305. For example, the image analysis engine 310 can be implemented on a server that is remotely located with respect to a mobile device or kiosk on which the image acquisition device 305 is disposed. In such cases, the image acquisition device 305 can be in communication with the image analysis engine 310 over one or more networks. In some implementations, at least a portion of the image analysis engine 310 can be located on the same device with the image acquisition device 305.

In some implementations, the image analysis engine 310 can implement a photometric stereo process to generate the 3D representation of the subject, based on one or more images selected from a sequence of images captured by the image acquisition device 305. This can include, for example, estimating the surface normals of the target in the two or images of the stereo pair. Because the amount of light reflected by a surface is dependent on the orientation of the surface in relation to the light source and the observer, possible surface orientations can be estimated from one image obtained under a particular illumination condition. In some implementations, if the distribution of illumination in two or more images are different, an orientation of a surface may be estimated based on such differences. In some cases, this is referred to as a shape-from-shading technique, and can be used to generate a 3D representation of the subject from a subset of images of a sequence captured using the image acquisition device 305.

In some implementations, the image analysis engine 310 generates the 3D representation of the subject using a structure-from-motion (SfM) process. SfM is an imaging technique for estimating 3D shapes or structures from two-dimensional (2D) image sequences having motion information linked thereto. Just as human-vision can perceive 3D shapes and structures by observing an object from different points-of-view, a SfM process determines the correspondence between multiple 2D images and to generate a corresponding 3D representation of the subject of the images. Any SfM technique can be used by the image analysis engine without departing from the scope of this disclosure. Other 3D reconstruction techniques such as stereophotogrammetry may be used in generating the 3D representations.

In some implementations, the image analysis engine 310 can include (or communicate with) a biometric authentication system 312 that controls access to the secure system 315. For example, the image analysis engine can determine, based on the 3D representation, that a subject in the images is an alternative representation of a live person. This can happen, for example, during a malicious attempt of unauthorized access to the secure system 315 in which the perpetrator of the attempt points the image acquisition device towards a high quality photograph of an authorized user that is printed on paper, or displayed on a high resolution display device. Responsive to determining that the subject is an alternative representation of a live person, the image analysis engine can preemptively prevent any of the images to be further processed by the biometric authentication system 312, thereby preventing access to a secure system 315. On the other hand, if the image analysis engine 310 determines that the subject of the images is a live person, an authentication process based on one or more images of the captured sequence can be initiated (e.g., at the biometric authentication system 312) to determine if the live person is authorized to access the secure system 315.

Figure 4:
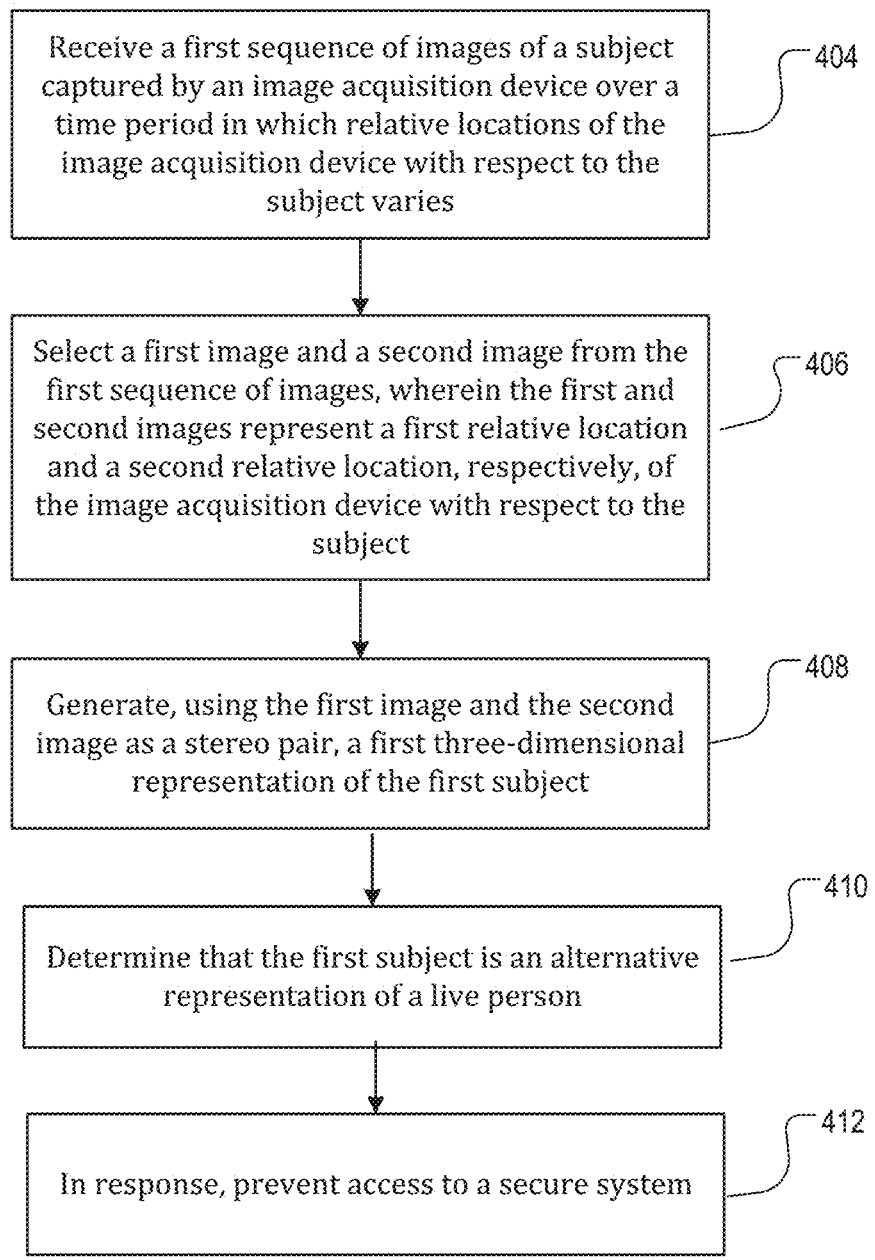
FIG. 4 is a flowchart of an example process for preventing access to a secure system in accordance with technology described herein.

FIG. 4 is a flowchart of an example process 400 for preventing access to a secure system in accordance with technology described herein. In some implementations, at least a portion of the process 400 may be executed by one or more processing devices disposed within a mobile device 102 described with reference to FIG. 1A. In some implementations, at least a portion of the process 400 may be executed by one or more processing devices disposed within a kiosk 200 described with reference to FIG. 2. In some implementations, at least a portion of the process 400 may be executed at one or more servers (such as servers or computing devices in a distributed computing system) in communication with remote components such as one or more processing devices disposed within a kiosk or a mobile device. In some implementations, at least a portion of the process 400 can be executed by an image analysis engine 310, as described with reference to FIG. 3, possibly in conjunction with a biometric authentication system 312.

Operations of the process 400 includes receiving, at one or more processing devices, a first sequence of images of a first subject captured by an image acquisition device over a time period in which relative locations of the image acquisition device with respect to the first subject varies (404). In some implementations, the image acquisition device can be a camera disposed on a mobile device, and the sequence of images can be captured as the mobile device is moved towards the subject, for example, as described above with reference to FIGS. 1A-1C. In some implementations, the image acquisition device can be a camera disposed on a kiosk device, and the sequence of images can be captured as the subject moves towards the kiosk device, for example, as described with reference to FIG. 2.

Operations of the process 400 also includes selecting a first image and a second image from the first sequence of images (406). The first image represents a first relative location of the image acquisition device with respect to the first subject, and the second image represents a second relative location, different from the first relative location, of the image acquisition device with respect to the first subject. In one example, the image 105b of FIG. 1B can be the first image, and the image 105c of FIG. 1C can be the second image. The images can be selected, for example, based on whether the subject is captured in the images from two different viewpoints such that a 3D representation can be generated using the images as a stereo pair.

Operations of the process 400 also includes generating, using the first image and the second image as a stereo pair, a first three-dimensional representation of the first subject (408). This can be done using a photometric stereo process for estimating a three dimensional shape from two dimensional images, as described in detail with reference to FIG. 3. For example, the photometric stereo process can include a structure-from-motion process, a shape-from-shading process, or another stereophotogrammetry process.

Operations of the process 400 can further include determining, based on the three dimensional representation, that the subject in the images is an alternative representation of a live person (410), and in response, preventing access to a secure system (412). The alternative representation of the live person can include a photograph of the live person printed on paper, or presented on a display device. Preventing access to the secure system can include preempting a biometric authentication process using the captured images, for example, as described above with reference to FIG. 3. This in turn can improve performance of an underlying biometric authentication system by filtering out spoof attacks at a front end, and thereby reducing waste of computational resources. In some implementations, if a determination is made that the subject in the images is in fact a live person (e.g., based on determining that the 3D representation generated from the facial images is consistent with a representation of a human head), an authentication process can be initiated to determine if the live person is authorized to access the secure system. This can include, for example, performing a face/iris/eyeprint identification or verification based on the images of the subject to determine if the subject is authorized to access the underlying secure system.

Figure 5:
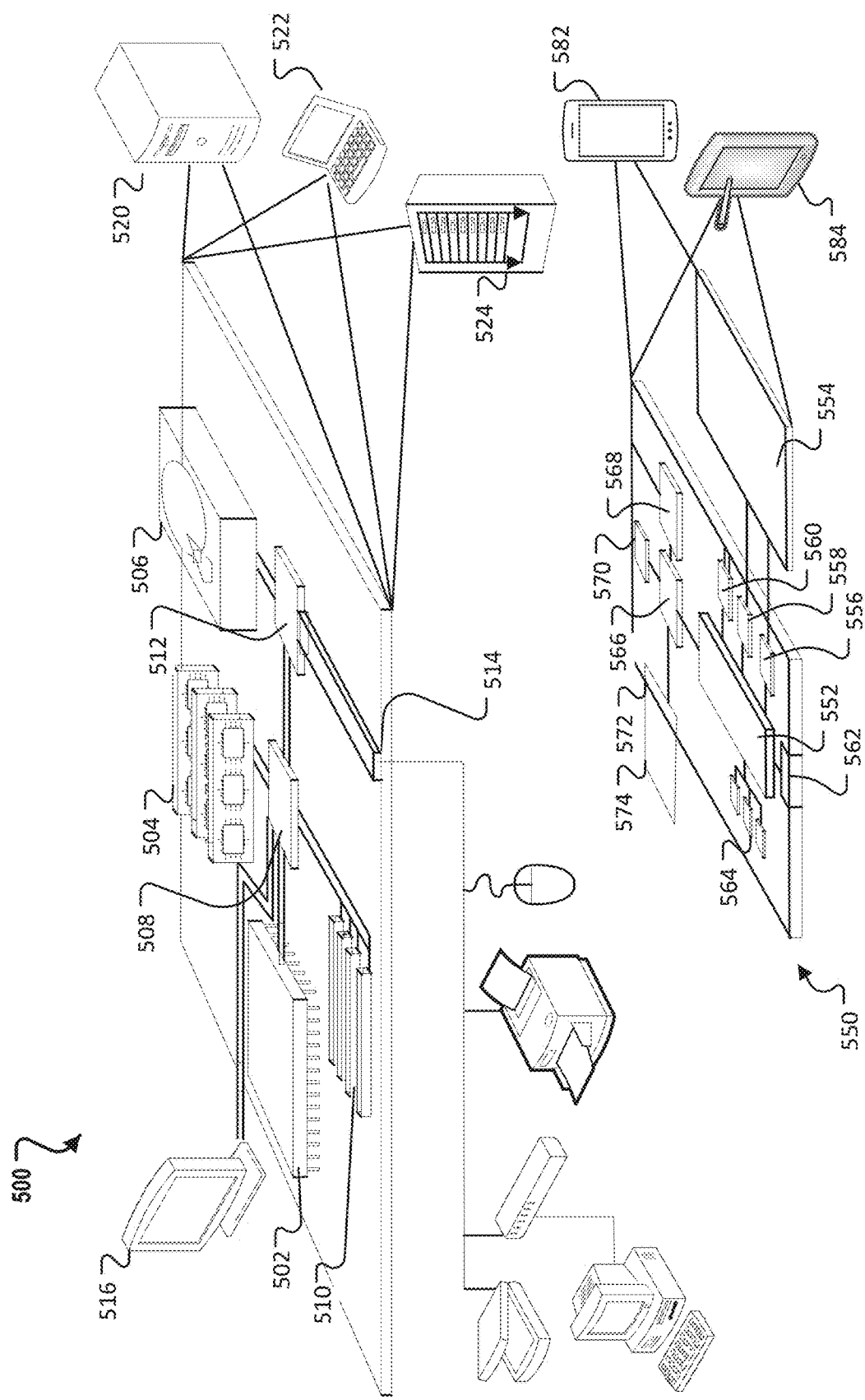
FIG. 5 is a block diagram representing examples of computing devices.

FIG. 5 shows an example of a computing device 500 and a mobile device 550, which may be used with the techniques described here. For example, referring to FIG. 1, the kiosk device 100 can include one or more of the computing device 500 or the mobile device 550, either in part or in its entirety. Computing device 5400 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, and so forth) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, tablet computer 584, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification the term "engine" is used broadly to refer to a software-based system, subsystem that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Although a few implementations have been described in detail above, other modifications may be made without departing from the scope of the inventive concepts described herein, and, accordingly, other implementations are within the scope of the following claims.

What is claimed is:

1. A method comprising:
    receiving, at one or more processing devices, a first sequence of images of a first subject captured by an image acquisition device over a time period in which relative locations of the image acquisition device with respect to the first subject varies;
    selecting, by the one or more processing devices, a first image and a second image from the first sequence of images, wherein the first image represents a first relative location of the image acquisition device with respect to the first subject, and the second image represents a second relative location, different from the first relative location, of the image acquisition device with respect to the first subject;
    generating, by the one or more processing devices and using the first image and the second image as a stereo pair, a first three-dimensional representation of the first subject using a photometric stereo process for estimating a three dimensional shape from two dimensional images;
    determining, based on the first three dimensional representation, that the first subject is an alternative representation of a live person; and
    responsive to determining that the first subject is an alternative representation of a live person, preventing access to a secure system.

2. The method of claim 1, wherein the image acquisition device is a camera disposed on a mobile device, and the sequence of images are captured as the mobile device is moved towards the first subject.

3. The method of claim 1, wherein the image acquisition device is a camera disposed on a kiosk device, and the sequence of images are captured as the first subject moves towards the kiosk device.

4. The method of claim 1, wherein the alternative representation of the live person comprises a photograph of the live person printed on paper, or presented on a display device.

5. The method of claim 1, wherein the photometric stereo process comprises a structure-from-motion process.

6. The method of claim 1, wherein the photometric stereo process comprises a shape-from-shading process.

7. The method of claim 1, further comprising:
    receiving, at the one or more processing devices, a second sequence of images of a second subject captured by the image acquisition device over a time period in which relative locations of the image acquisition device with respect to the second subject varies;
    selecting, by the one or more processing devices, a third image and a fourth image from the second sequence of images, wherein the third image represents a first relative location of the image acquisition device with respect to the second subject, and the fourth image represents a second relative location, different from the first relative location, of the image acquisition device with respect to the second subject;
    generating, by the one or more processing devices and using the third image and the fourth image as a stereo pair, a second three-dimensional representation of the second subject;
    determining, based on the second three dimensional representation, that the second subject is a live person; and
    responsive to determining that the second subject is a live person, initiating an authentication process for the live person to access the secure system.

8. An system comprising:
    an image acquisition device configured to capture a first sequence of images of a first subject over a time period in which relative locations of the image acquisition device with respect to the first subject varies; and
    an image analysis engine comprising one or more processing devices, wherein the image analysis engine is configured to:
    receive the first sequence of images,
    select a first image and a second image from the first sequence of images, wherein the first image represents a first relative location of the image acquisition device with respect to the first subject, and the second image represents a second relative location, different from the first relative location, of the image acquisition device with respect to the first subject,
    generate, using the first image and the second image as a stereo pair, a first three-dimensional representation of the first subject using a photometric stereo process for estimating a three dimensional shape from two dimensional images,
    determine, based on the first three dimensional representation, that the first subject is an alternative representation of a live person, and
    responsive to determining that the first subject is an alternative representation of a live person, prevent access to a secure system.

9. The system of claim 8, wherein the image acquisition device comprises a camera disposed on a mobile device, and the sequence of images are captured as the mobile device is moved towards the first subject.

10. The system of claim 8, wherein the image acquisition device is a camera disposed on a kiosk device, and the sequence of images are captured as the first subject moves towards the kiosk device.

11. The system of claim 8, wherein the alternative representation of the live person comprises a photograph of the live person printed on paper, or presented on a display device.

12. The system of claim 8, wherein the photometric stereo process comprises a structure-from-motion process.

13. The system of claim 8, wherein the photometric stereo process comprises a shape-from-shading process.

14. The system of claim 8, wherein the image analysis engine is configured to:
  receive a second sequence of images of a second subject captured by the image acquisition device over a time period in which relative locations of the image acquisition device with respect to the second subject varies;
  select a third image and a fourth image from the second sequence of images, wherein the third image represents a first relative location of the image acquisition device with respect to the second subject, and the fourth image represents a second relative location, different from the first relative location, of the image acquisition device with respect to the second subject;
  generate, using the third image and the fourth image as a stereo pair, a second three-dimensional representation of the second subject;
  determine, based on the second three dimensional representation, that the second subject is a live person; and
  responsive to determining that the second subject is a live person, initiate an authentication process for the live person to access the secure system.

15. One or more non-transitory machine-readable storage devices having encoded thereon computer readable instructions for causing one or more processing devices to perform operations comprising:
  obtaining a first sequence of images of a first subject captured by an image acquisition device over a time period in which relative locations of the image acquisition device with respect to the first subject varies;
  selecting a first image and a second image from the first sequence of images, wherein the first image represents a first relative location of the image acquisition device with respect to the first subject, and the second image represents a second relative location, different from the first relative location, of the image acquisition device with respect to the first subject;
  generating, using the first image and the second image as a stereo pair, a first three-dimensional representation of the first subject using a photometric stereo process for estimating a three dimensional shape from two dimensional images;
  determining, based on the first three dimensional representation, that the first subject is an alternative representation of a live person; and
  responsive to determining that the first subject is an alternative representation of a live person, preventing access to a secure system.

16. The one or more non-transitory machine-readable storage devices of claim 15, wherein the image acquisition device is a camera disposed on a mobile device, and the sequence of images are captured as the mobile device is moved towards the first subject.

17. The one or more non-transitory machine-readable storage devices of claim 15, wherein the image acquisition device is a camera disposed on a kiosk device, and the sequence of images are captured as the first subject moves towards the kiosk device.

18. The one or more non-transitory machine-readable storage devices of claim 15, wherein the operations further comprise:
  obtaining a second sequence of images of a second subject captured by the image acquisition device over a time period in which relative locations of the image acquisition device with respect to the second subject varies;
  selecting a third image and a fourth image from the second sequence of images, wherein the third image represents a first relative location of the image acquisition device with respect to the second subject, and the fourth image represents a second relative location, different from the first relative location, of the image acquisition device with respect to the second subject;
  generating using the third image and the fourth image as a stereo pair, a second three-dimensional representation of the second subject;
  determining, based on the second three dimensional representation, that the second subject is a live person; and
  responsive to determining that the second subject is a live person, initiating an authentication process for the live person to access the secure system.

19. The one or more non-transitory machine-readable storage devices of claim 15, wherein the alternative representation of the live person comprises a photograph of the live person printed on paper, or presented on a display device.

20. The one or more non-transitory machine-readable storage devices of claim 15, wherein the photometric stereo process comprises a structure-from-motion process or a shape-from-shading process.

* * * * *

UNITED STATES PATENT AND TRADEMARK OFFICE
CERTIFICATE OF CORRECTION

| | | |
|---|---|---|
| PATENT NO. | : 11,216,680 B2 | Page 1 of 1 |
| APPLICATION NO. | : 17/208842 | |
| DATED | : January 4, 2022 | |
| INVENTOR(S) | : Gregory Lee Storm et al. | |

It is certified that error appears in the above-identified patent and that said Letters Patent is hereby corrected as shown below:

On the Title Page

Column 1 (item (63), Related U.S. Application Data), Line 2, delete "10,953,762." and insert -- 10,956,762. --

Signed and Sealed this
Thirty-first Day of May, 2022

Katherine Kelly Vidal
*Director of the United States Patent and Trademark Office*